United States Patent [19]

Wolfe

[11] Patent Number: 4,980,327

[45] Date of Patent: Dec. 25, 1990

[54] REDUCED AND STABILIZED HYDROGENATION CATALYSTS

[75] Inventor: David C. Wolfe, Louisville, Ky.

[73] Assignee: United Catalysts Inc., Louisville, Ky.

[21] Appl. No.: 489,442

[22] Filed: Mar. 6, 1990

[51] Int. Cl.$^5$ .................. B01J 31/34; B01J 31/28; B01J 31/02

[52] U.S. Cl. ...................... 502/62; 502/165; 502/167; 502/173

[58] Field of Search ............ 502/62, 165, 167, 173

[56] References Cited

U.S. PATENT DOCUMENTS

| | | | |
|---|---|---|---|
| 4,041,225 | 8/1977 | Pullurat | 502/167 |
| 4,096,093 | 6/1978 | Hwang | 502/167 |
| 4,161,483 | 7/1979 | Cahen | 502/167 |
| 4,166,805 | 9/1979 | Jowett | 502/167 |
| 4,309,511 | 1/1982 | Jefferson et al. | 502/165 |
| 4,471,068 | 9/1984 | Haitko | 502/165 |
| 4,808,562 | 2/1989 | Kubersky et al. | 502/151 |

Primary Examiner—Patrick P. Garvin
Assistant Examiner—E. D. Irzinski
Attorney, Agent, or Firm—Herbert P. Price

[57] ABSTRACT

Transition metal on an inert stable carrier hydrogenation catalysts are stabilized with a coating of a fatty amine and an alkane wherein the fatty amine-alkane coating has a melting point of about 130° C. to about 180° F.

16 Claims, No Drawings

REDUCED AND STABILIZED HYDROGENATION CATALYSTS

BACKGROUND OF THE INVENTION

The field of art to which this invention pertains is reduced and stabilized hydrogenation catalysts.

Finely divided reduced nickel catalysts have been used as hydrogenation catalysts for a large number of years. The preparation of such catalysts on diatomaceous earth or Kieselguhr is described, for example, in "Reactions of Hydrogen with Organic Compounds over Copper-Chromium Oxide and Nickel Catalysts" by Homer Adkins, University of Wisconsin Press (1937). Catalysts of this type are very sensitive to air in their activity to the point of being pyrophoric and, therefore, must be stabilized against the action of air in order to be utilized commercially.

U.S. Pat. No. 4,808,562 discloses processes for stabilizing finely divided pyrophoric catalysts by impregnating them with solid fats, solid paraffin, fatty amines or similar products.

Nickel catalysts dispersed in fat are described in U.S. Pat. No. 2,609,346.

According to U.S. Pat. No. 2,865,865, Raney nickel catalysts are mixed with a fatty alcohol to form a solid suspension of the catalyst in the fatty alcohol.

U.K. Patent No. 2,052,296 describes a process for stabilizing Raney metal catalysts. For example, a water wet Raney nickel catalyst is rendered oleophilic by a surface active agent followed by dispersing the oleophilic particles in molten wax, fat, or organic polymer and then solidifying the mixture. Examples of surface active agents, which are used in the amounts of $\frac{1}{2}$ to 1 percent by weight based on the weight of catalyst and water, include the organic acid salts of long chain amines, such as tallow amine, soy bean oil amine and the like.

The use of nickel catalysts in the hydrogenation of nitriles to amines is well known and is described in such publications as "Reactions of Hydrogen with Organic Compounds" referred to hereinabove as well as U.S. Pat. Nos. 3,293,298, 3,163,676 and Japanese Patent No. 6464/55.

SUMMARY OF INVENTION

This invention is directed to hydrogenation catalysts. The invention pertains to a reduced and stabilized hydrogenation catalyst.

The catalyst of this invention is a particulate transition metal on a suitable carrier hydrogenation catalyst stabilized with a fatty amine and an alkane. The catalyst contains (A) about 20 to about 50 weight percent transition metal on a suitable carrier encapsulated with (B) about 50 to about 80 weight percent fatty amine and the alkane, said weight percents being based on the weight of (A) and (B). Preferably, the catalyst contains about 30 to about 50 weight percent of (A) and about 50 to about 70 weight percent of (B). (A) contains about 25 to about 35 weight percent reduced transition metal, about 25 to about 35 weight percent transition metal oxide and about 30 to about 50 weight percent suitable carrier, said weight percents being based on the weight of (A). (B) contains about 85 to about 95 weight percent fatty amine and about 5 to about 15 weight percent alkane, said weight percents being based on the weight of (B). The fatty groups of the fatty amine are alkyl groups containing 12 to 22 carbon atoms. The alkane contains about 10 to about 22 carbon atoms. The blend of fatty amine and alkane has a melting point between about 130° F. and about 180° F.

DESCRIPTION OF THE INVENTION

The hydrogenation catalyst of this invention are used, primarily, in the manufacture of fatty amines, i.e., alkyl amines wherein each alkyl group contains about 12 to about 22 carbon atoms. An example of such amines is saturated tallow amine. The amines are derived from fatty nitriles which in turn are derived from fatty acids. In the reaction scheme, natural fats and oils, e.g., tallow, are reacted to form fatty acids which are treated with ammonia to form fatty acid amides which are then converted to nitriles. An example of such a reaction scheme is found in U.S. Pat. No. 3,299,117. The fatty nitriles are then hydrogenated to amines using the catalysts of this invention.

Reduced transition metal catalysts are sensitive to the action of air to the point of being pyrophoric. In order to protect such catalysts from air and to preserve their reactivity, they are encapsulated, according to this invention, with a fatty amine which amine is also the desired product of the fatty nitrile hydrogenation reaction. This encapsulation stabilizes the catalyst against the action of air. However, during storage, it has been found that an in situ reaction takes place between the amine coating and the reduced transition metal resulting in the formation of, for example, higher order amines, amides and imides whereby free ammonia is released to the environment, and subsequent loss in the activity of the catalyst occurs. The addition of the alkane to the amine coating results in a catalyst which retains its activity and from which there is no evolution of ammonia.

The transition metals used in the catalysts of this invention include iron, cobalt, nickel, copper, zinc, molybdenum, and tin either alone or in various combinations. The preferred metals are iron, cobalt, and nickel with nickel being most preferred.

The carriers useful in this invention are any of the well known inert materials which are used to support finely divided metals. Example of such carriers are diatomaceous earth (Kieselguhr), pumice, activated clay, natural and synthetic aluminas and silicas, and combinations of any of the above.

The transition metal on inert carrier catalysts have been known for a considerable number of years and can be prepared by impregnating a porous support, e.g., diatomaceous earth, with an aqueous solution of the metal salt, precipitating the metal as the oxide, hydroxide, or carbonate with a base, drying the mass, and reducing the oxide to the metal with hydrogen. The preparation of such metal catalysts is described in U.S. Pat. No. 3,235,515 which is hereby incorporated by reference.

The transition metal-inert carrier catalysts contain about 50 to about 70 weight percent metal/metal oxide and about 30 to about 50 weight percent carrier. About 40 to about 60 weight percent of the metal/metal oxide is reduced to the metal. The catalysts can also contain a small amount of promoters, such as aluminum, magnesium, zirconium, or titanium. Generally, such promoters will be used in the amount of 0 to about 5 weight percent based on the weight of the catalysts.

The fatty amines which are used as coatings or as encapsulants for the metal-carrier catalysts are primary and secondary amines which have about 12 to about 22 carbon atoms in each alkyl group. Examples of such amines are lauryl amine, dilauryl amine, myristyl amine, dimyristyl amine, palmyl amine, dipalmyl amine, stearyl amine, distearyl amine, archidyl amine, diarchidyl amine, behenyl amine and dibehenyl amine. The preferred amines are those containing 16 to 18 carbon atoms in each fatty group. The most preferred amines are secondary amines containing 18 carbon atoms in each fatty group. Exemplary of such preferred amines is di(saturated tallow) amine.

The alkanes useful in this invention are the ten to twenty two carbon atom alkanes, i.e., dodecane, tetradecane, hexadecane, octadecane, eicosane and docosane. The preferred alkanes are hexadecane and octadecane. Mixtures of the alkanes can be used.

The coating or encapsulating composition, i.e., the blend of fatty amine and alkane, has a melting point of about 130° F. to about 180° F. As stated hereinbefore, the preferred amines for use in this invention are those which are the product of the fatty nitrile hydrogenation reaction for which the catalysts of this invention are used.

The coating or encapsulant contains about 5 to about 15 weight percent alkane and about 85 to about 95 weight percent amine. The catalyst consists of about 20 to about 50 weight percent metal/metal oxide-inert carrier and about 50 to about 80 weight percent amine/alkane.

In preparing the catalysts of this invention, the amine is heated to at least about 175° F., preferably 200°–210° F., and the alkane is combined and blended in. The metal/metal oxide-inert carrier catalyst is then added and dispersed throughout the amine/alkane blend. The mass is then cooled and formed into flakes or postilles.

The following examples describe the invention in more detail. Parts and percentages are by weight unless otherwise designated.

EXAMPLE 1

To a blender are added 71.8 parts of di(saturated tallow) amine and 8 parts of octadecane. Heat and agitation are applied raising the temperature to 200° F. A nickel on diatomaceous earth catalyst, 20.2 parts, is added and dispersed throughout the blend. The nickel catalyst contains 13.4 parts nickel/nickel oxide and 6.8 parts diatomaceous earth carrier. The percent nickel, i.e., reduced nickel, in the metal/metal oxide is 45 percent. When thorough dispersion is obtained, the mass is cooled to room temperature and is formed into postilles. The postilles are found to be stable on storage with no loss in activity or evolution of ammonia.

EXAMPLE 2

To a suitable reactor are added 1075 parts of distilled tallow nitrile and 12 parts of the postilles described in Example 1. This amount of catalyst is equal to 0.15 percent Ni/NiO based on the weight of the nitrile. The reactor is purged with nitrogen, and heat is applied raising the temperature to 110° C. The nitrogen purge is replaced with hydrogen, and the nitrogen is purged from the system. The inlet and exit reactor gas valves are closed, the temperature is raised to 150° C., and the pressure is adjusted to 60 psig. Hydrogen is then introduced at a purge rate of 100 liters/hour while keeping the pressure at 60 psig and venting hydrogen along with ammonia which results from the reaction.

Forty minutes after purging with hydrogen had begun, analysis of a sample shows that conversion of nitrile to amine is 33.9 percent with the amount of secondary amine being 15.2 percent. After 80 minutes, the conversion from nitrile to amine is 67.4 percent with the amount of secondary amine being 31.7 percent. After 120 minutes, the conversion from nitrile to amine is 86.4 percent, and the amount of secondary amine is 50.7 percent.

EXAMPLE 3

Using the same procedure described in Example 1, a nickel/nickel oxide catalyst on diatomaceous earth is encapsulated with di(saturated tallow) amine and hexadecane. The catalyst contains 71.6 parts of di(saturated tallow) amine, 8 parts of hexadecane 13.5 parts of nickel/nickel oxide, and 6.9 parts of diatomaceous earth. The nickel/nickel oxide is 47.9 percent reduced nickel.

Using the same procedure described in Example 2, this catalyst is used in the hydrogenation of tallow nitrile to amine. The conversion data are shown in Table 1.

EXAMPLE 4

Using the same procedure described in Example 1, a nickel/nickel oxide on diatomaceous earth catalyst is encapsulated with di(saturated tallow) amine and mineral oil. The catalyst contained 68.2 percent di(saturated tallow) amine, 7.6 percent mineral oil, 16.0 percent Ni/NiO, of which 36.1 percent is reduced Ni, and 8.2 percent diatomaceous earth.

Using the same procedure described in Example 2, this catalyst is used in the hydrogenation of tallow nitrile to amine. The conversion data are shown in Table 1.

Hydrogenation of tallow nitrile is also conducted with uncoated catalyst, 66.2 percent Ni/NiO of which 45.1 percent is reduced Ni, and 33.8 percent diatomaceous earth. This reaction is listed as the control in Table 1.

TABLE 1

| Example | Control | 2 | 3 | 4 |
|---|---|---|---|---|
| % Conv. from Nitrile to Amine | | | | |
| at 40 minutes | 30.0 | 33.9 | 19.0 | 15.4 |
| at 80 minutes | 62.6 | 67.4 | 55.1 | 47.2 |
| at 120 minutes | 80.8 | 86.4 | 76.2 | 72.3 |
| % Secondary Amine | | | | |
| at 40 minutes | 11.5 | 15.2 | 5.5 | 4.7 |
| at 80 minutes | 33.5 | 31.7 | 26.5 | 24.0 |
| at 120 minutes | 49.6 | 50.7 | 38.5 | 42.4 |

EXAMPLE 5

Additional catalysts are prepared by coating Ni/NiO on diatomaceous earth with di(saturated tallow) amine and octadecane. These catalysts are then used in the hydrogenation conversion of tallow nitrile to di(saturated tallow) amine using the procedure described in Example 2. The catalyst components and conversion data are shown in Table II.

TABLE 2

| Example | Control | 5A | 5B | 5C |
|---|---|---|---|---|
| Catalyst Comp. | | | | |
| % Ni/NiO | 60.1 | 27.6 | 26.0 | 26.8 |
| % Reduced Ni | 40.3 | 58.0 | 58.0 | 39.0 |
| % Diatomaceous Earth | 39.9 | 18.3 | 17.3 | 17.8 |
| % Di(saturated tallow) | — | 48.7 | 51.0 | 50.4 |

TABLE 2-continued

| Example | Control | 5A | 5B | 5C |
|---|---|---|---|---|
| amine | | | | |
| % Octadecane | — | 5.4 | 5.7 | 5.5 |
| % Conv. of Nitrile to Amine | | | | |
| at 40 minutes | 65.3 | 62.0 | — | 69.6 |
| at 80 minutes | 96.7 | 95.8 | 91.0 | 97.6 |
| at 120 minutes | 100.0 | 102.8 | 99.8 | 99.6 |
| % Secondary Amine | | | | |
| at 40 minutes | 25.2 | 24.9 | — | 32.7 |
| at 80 minutes | 38.1 | 48.2 | 42.3 | 47.3 |
| at 120 minutes | 60.0 | 61.3 | 60.0 | 50.5 |
| Iodine Value | | | | |
| at 160 minutes | 14.3 | 25.8 | 16.8 | 19.7 |
| at 180 minutes | 3.7 | 18.8 | 2.7 | 4.1 |
| at 240 minutes | 2.6 | 17.0 | 2.3 | 3.6 |

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A particulate transition metal hydrogenation catalyst on an inert stable carrier stabilized with a fatty amine and an alkane having 10 to 22 carbon atoms and wherein the blend of amine and alkane has a melting point of about 130° F. to about 180° F.

2. The catalyst of claim 1 wherein the catalyst is comprised of (A) about 20 to about 50 weight percent transition metal on a suitable carrier, and
(B) about 50 to about 80 weight percent fatty amine and alkane wherein (A) contains about 25 to about 35 weight percent transition metal about 25 to about 35 weight percent transition metal oxide, and about 30 to about 50 weight percent inert carrier, said weight percents being based on the weight of (A), and wherein (B) contains about 85 to about 95 weight percent fatty amine and about 5 to about 15 weight percent alkane, said weight percents being based on the weight of (B).

3. The catalyst of claim 2 containing about 30 to about 50 weight percent (A) and about 50 to about 70 weight percent (B).

4. The catalyst of claim 1 wherein the transition metal is selected from the group consisting of iron, cobalt, nickel, copper, zinc, molybdenum, tin, and mixtures thereof.

5. The catalyst of claim 4 wherein the transition metal is nickel.

6. The catalyst of claim 1 wherein the inert stable carrier is selected from the group consisting of diatomaceous earth, pumice, activated clay, natural and synthetic alumina, natural and synthetic silica, and mixtures thereof.

7. The catalyst of claim 6 wherein the carrier is diatomaceous earth.

8. The catalyst of claim 1 wherein the fatty amine is a primary or secondary amine having about 12 to about 22 carbon atoms in each alkyl group.

9. The catalyst of claim 8 wherein the amine contains about 16 to about 18 carbon atoms in each alkyl group.

10. The catalyst of claim 8 wherein the fatty amine is di(saturated tallow) amine.

11. The catalyst of claim 1 wherein the alkane is octadecane.

12. The catalyst of claim 1 wherein the alkane is hexadecane.

13. A particulate nickel on diatomaceous earth hydrogenation catalyst stabilized with a coating of a fatty amine and octadecane, wherein the particulate nickel on diatomaceous earth (A) is present in the amount of about 30 to about 50 weight percent and wherein the coating (B) is present in the amount of about 50 to about 70 weight percent.

14. The catalyst of claim 13 wherein (A) contains about 25 to about 35 weight percent reduced nickel, about 25 to about 35 weight percent nickel oxide and about 30 to about 50 weight percent diatomaceous earth.

15. The catalyst of claim 13 wherein (B) contains about 85 to about 95 weight percent amine and about 5 to about 15 weight percent octadecane.

16. The catalyst of claim 13 wherein the fatty amine is di(saturated tallow) amine.

* * * * *

UNITED STATES PATENT AND TRADEMARK OFFICE
CERTIFICATE OF CORRECTION

PATENT NO. : 4,980,327

DATED : 12/25/90

INVENTOR(S) : David C. Wolfe et al

It is certified that error appears in the above-identified patent and that said Letters Patent is hereby corrected as shown below:

On the title page, item [75] Inventor: insert after "David C. Wolfe, Louisville, Kentucky," --Frederich Schmidt and Jurgen Ladebeck, both of the Federal Republic of Germany.--.

Signed and Sealed this

Eighth Day of December, 1992

Attest:

DOUGLAS B. COMER

*Attesting Officer*     Acting Commissioner of Patents and Trademarks